E. C. GORDON.
Fence.
No. 60,174.
Patented Dec. 4, 1866.
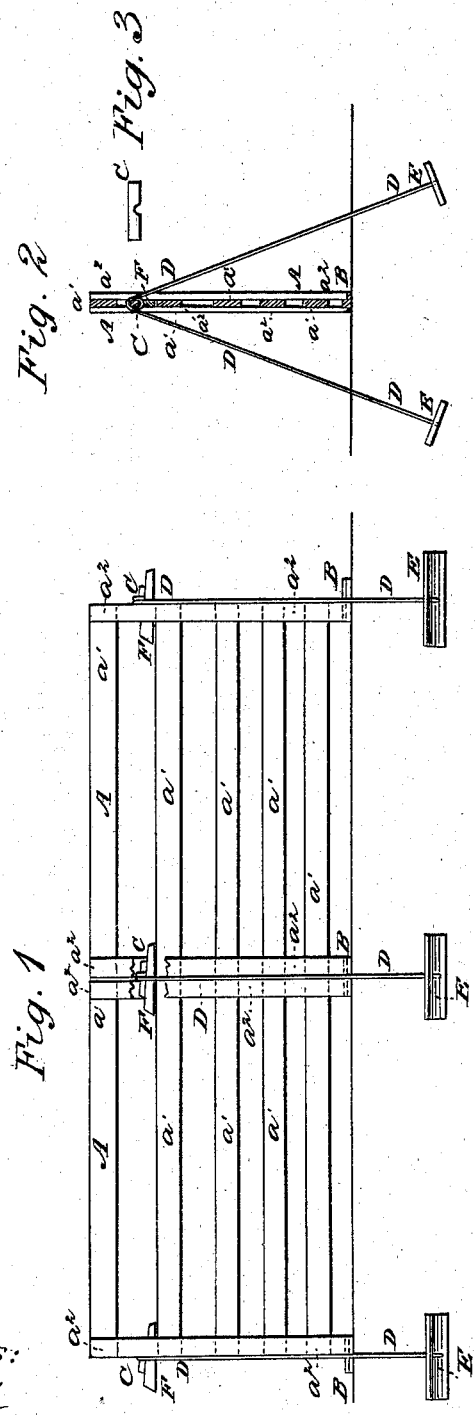

United States Patent Office.

IMPROVEMENT IN FENCE.

E. C. GORDON, OF SEVASTOPOL, INDIANA.

Letters Patent No. 60,174, dated December 4, 1866.

SPECIFICATION.

TO ALL WHOM IT MAY CONCERN:

Be it known that I, EDWARD C. GORDON, of Sevastopol, in the county of Kosciusko, and State of Indiana, have invented a new and useful Improvement in Fence; and I do hereby declare that the following is a full, clear, and exact description thereof, which will enable others skilled in the art to make and use the same, reference being had to the accompanying drawings, forming part of this specification, in which—

Figure 1 is a side view of a portion of my improved fence, a part being broken away to show the construction.
Figure 2 is an end view of the same.
Figure 3 is a detail side view of one of the keys by which the wire guys are connected to the fence.
Similar letters of reference indicate like parts.

My invention has for its object to furnish an improved fence, simple in construction, strong and durable. And it consists, first, in the combination of wire guys, keys, wedges, and anchoring-blocks with each other and with the fence panels; and, second, in the combination of the supporting blocks of baked clay with the panels of the fence, the whole being constructed and arranged in the manner hereinafter more fully described.

A are the panels, the horizontal bars, $a^1$, of which may be made of boards, planks, rails, or other suitable material, and they are connected and held in their proper relative positions by the vertical bars $a^2$, nailed, pinned, or otherwise secured across their ends, as shown in figs. 1 and 2. The lower ends of the vertical bars, $a^2$, project downward a little below the lower edge of the lowest horizontal bar, $a^1$, as shown in figs. 1 and 2, so as to leave a space between them for the reception of the upwardly projecting ridge of the supporting blocks. The supporting blocks, B, are made of baked clay, and have a ridge formed along their upper sides, which enters the space between the lower ends of the vertical bars, $a^2$, of the panels, and secures the lower part of the fence from being moved from its place by side pressure. C are keys, the lower edges of which are notched for the reception of the wire guys, D, as shown in fig. 3, and the ends of which are inserted in the spaces between the vertical and horizontal bars of the contiguous panels, A, as shown in fig. 1. The central part of the wire guys, D, is wound around the keys, C, as shown in figs. 1 and 2, and to their ends are attached bricks or wooden blocks, E. Either bricks or wooden blocks may be used, but I prefer to use bricks, or other mineral blocks, as not liable to decay from exposure to moisture. These blocks, E, are buried in the ground on each side of the fence, and the wire guys, D, are of such a length as to allow the said blocks to be buried from a foot to sixteen inches deep. This construction prevents the guys from being slackened by the action of the frost, as is the case when the lower ends of the said guys are attached to stakes driven into the ground. The guys are then tightened by wedges, F, driven between the lower edges of the keys, C, and the upper edges of the horizontal bars, $a^1$, above which the said keys, C, are placed, as shown in figs. 1 and 2. The notches on the lower edges of the keys, C, in which the turn of the wire rests, enable the wedges, F, to be driven in easily and tightly without interfering with or being obstructed by the said wires, D.

What I claim as new, and desire to secure by Letters Patent, is—

1. The combination of the wire guys D, keys C, wedges F, and anchoring-blocks E with each other and with the panels A of the fence, when said guys, keys, wedges, and blocks are constructed and arranged substantially as herein described and for the purpose set forth; and, 2. The combination of the supporting blocks B, with the panels A, of the fence, when said blocks are constructed substantially as herein described and for the purpose set forth.

EDWARD C. GORDON.

Witnesses:
J. W. DUNLAP,
A. M. TOWL.